United States Patent [19]
Kirker et al.

[11] Patent Number: 5,735,219
[45] Date of Patent: Apr. 7, 1998

[54] OPEN BASE ADJUSTABLE PALLET FOR SUPPORTING WORK PIECES

[75] Inventors: Eric John Kirker, Vandalia; Taggert R. McGough, Clayton; William R. Patterson, Miamisburg, all of Ohio

[73] Assignee: Odawara Automation, Inc., Tipp City, Ohio

[21] Appl. No.: 757,431

[22] Filed: Nov. 27, 1996

[51] Int. Cl.⁶ .................................................. B65D 19/38
[52] U.S. Cl. ................................. 108/54.1; 108/55.1
[58] Field of Search ........................... 108/54.1, 55.1, 108/55.3, 51.1; 248/346.1

[56] References Cited

U.S. PATENT DOCUMENTS

| | | |
|---|---|---|
| 140,404 | 7/1873 | Coe . |
| 957,721 | 5/1910 | Troup . |
| 1,318,057 | 10/1919 | Dean . |
| 1,403,997 | 1/1922 | Aeschbach . |
| 2,828,931 | 4/1958 | Harvey ................. 108/54.1 X |
| 2,873,934 | 2/1959 | Settles ................... 108/54.1 |
| 2,903,217 | 9/1959 | Collins et al. ......... 108/54.1 |
| 2,942,827 | 6/1960 | Edson .................... 108/54.1 |
| 3,176,632 | 4/1965 | Yingling ................ 108/54.1 |
| 3,208,606 | 9/1965 | Epstein ................ 108/54.1 X |
| 3,222,055 | 12/1965 | Cook . |
| 3,240,485 | 3/1966 | Oser . |
| 3,695,187 | 10/1972 | Weiss ..................... 108/54.1 |
| 3,880,074 | 4/1975 | Seifert . |
| 4,002,328 | 1/1977 | Wolf et al. . |
| 4,477,064 | 10/1984 | DiGiulio . |
| 4,489,926 | 12/1984 | Blatrix . |
| 4,492,301 | 1/1985 | Inaba et al. . |
| 4,557,371 | 12/1985 | Yonezawa . |
| 4,667,804 | 5/1987 | Dubit et al. . |
| 4,698,475 | 10/1987 | Lothenbach et al. . |
| 4,713,883 | 12/1987 | Santandrea et al. . |
| 4,768,727 | 9/1988 | Santandrea et al. . |
| 4,787,505 | 11/1988 | Tweedy . |
| 4,946,021 | 8/1990 | Murphy . |
| 4,965,924 | 10/1990 | Santandrea et al. . |
| 5,060,780 | 10/1991 | Santandrea et al. . |
| 5,065,499 | 11/1991 | Luciano et al. . |
| 5,068,781 | 11/1991 | Santandrea et al. . |
| 5,092,454 | 3/1992 | Carlson . |
| 5,099,978 | 3/1992 | Santandrea et al. . |
| 5,099,979 | 3/1992 | Kehrel . |
| 5,115,901 | 5/1992 | Santandrea et al. . |
| 5,240,235 | 8/1993 | Santandrea et al. . |
| 5,244,082 | 9/1993 | Togashi . |
| 5,255,778 | 10/1993 | Santandrea et al. . |
| 5,297,485 | 3/1994 | Bond ..................... 108/54.1 X |
| 5,346,058 | 9/1994 | Santandrea et al. . |
| 5,348,142 | 9/1994 | Nishimura et al. . |
| 5,373,623 | 12/1994 | Santandrea . |
| 5,388,532 | 2/1995 | Wakano ................ 108/54.1 X |

FOREIGN PATENT DOCUMENTS

| | | |
|---|---|---|
| 0447805 | 9/1991 | European Pat. Off. . |
| 0348715 | 9/1992 | European Pat. Off. . |
| 1038482 | 9/1958 | Germany ............... 108/54.1 |
| 619392 | 8/1978 | U.S.S.R. ............... 108/54.1 |

*Primary Examiner*—Jose V. Chen
*Attorney, Agent, or Firm*—Thompson Hine & Flory LLP

[57] ABSTRACT

An open base adjustable pallet for supporting work pieces comprising: at least one carriage rod; a first support member mounted for travel along the carriage rod, the first support member including (a) a torsion spring having a helical portion which encircles the carriage rod and engages the carriage rod when the spring is relaxed and disengages from the second carriage rod when the second spring is compressed; and a second support member mounted on the of carriage rod, wherein the first support member is capable of being adjusted along of carriage rod relative to the second support member, thereby enabling the pallet to receive work pieces of differing sizes.

14 Claims, 5 Drawing Sheets

5,735,219

OPEN BASE ADJUSTABLE PALLET FOR SUPPORTING WORK PIECES

BACKGROUND

The present invention relates to an open base adjustable pallet for supporting work pieces in an automated assembly production line.

Pallets for supporting work pieces for use in an automated assembly production line are known in the art. Examples of these pallets can be found in U.S. Pat. Nos. 4,787,505; 4,492,301; 5,060,780; 5,099,978; 5,115,901; and 5,348,142.

Pallet conveyor systems are commonly used in automated assembly production lines. A work piece that is to be assembled, machined or operated on rests on supports which are mounted on the pallet. The pallet: serves as both a support for the part to be assembled and also as a means for transporting the part from one assembly station to the next. To move from one assembly station to the next, a conveyor system usually transports the pallet and the part along the assembly line in which separate workstations perform specific operations on the part. Typically, these production processes employ a plurality of pallets and workstations.

In a typical system, a belt conveyor frictionally engages the pallet and moves the pallet from one assembly station to the next. When the pallet arrives at a workstation, the pallet is stopped and the workstation begins its operation. To work on the part, the workstation either removes the part from the pallet, works on the part as it rests on the pallet or removes the entire pallet from the conveyor to perform its work operations. When the workstation concludes its operation, it returns the part to the pallet and the pallet is released to continue down the assembly line to the next workstation. The pallets of the prior art include a support platform which not only represents additional expense, but reduce the flexibility of the pallet with respect to allowing the work piece to be worked on from below as well as above the workpiece.

SUMMARY OF THE INVENTION

The present invention provides an open base adjustable pallet for supporting work pieces of varying sizes. The open base adjustable pallet of this invention is defined as a pallet which does not have a support platform. This open base adjustable pallet can be used with automated assembly work piece production lines.

The open base adjustable pallet of this invention comprises at least one horizontally oriented carriage rod and, preferably, a pair of carriage rods which are horizontally oriented and parallel to each other, and a pair of spaced apart support members mounted on the carriage rods. The shape of each support member is designed to centrally retain a work piece in position on the support member. One of the support members is releasably fixed at corresponding ends of the carriage rods and the other support member is mounted for extensible travel along the carriage rods. Because one of the support members is movable in relation to the other fixed support member, the distance between the two support members can be adjusted to accommodate work pieces of differing sizes. The movable support member includes one or more coupling devices depending on the number of carriage rods. In a preferred aspect of the invention, the movable support member includes two coupling devices such as a pair of torsion springs, each spring having a helical portion which encircles and, when relaxed, frictionally engages a corresponding carriage rod. When the springs are compressed, they disengage from the rods allowing the support member to be moved along the rods. The open base pallet of the present invention is useful not only because it is adjustable to accommodate work pieces of different sizes, but it is particularly useful because it allows the work piece to be easily and conveniently worked on from above and/or below the pallet. Furthermore, the open base pallet of the present invention does not require the cumbersome and expensive pallet support platform associated with the prior art pallets.

DETAILED DESCRIPTION OF THE INVENTION

Figure 1:
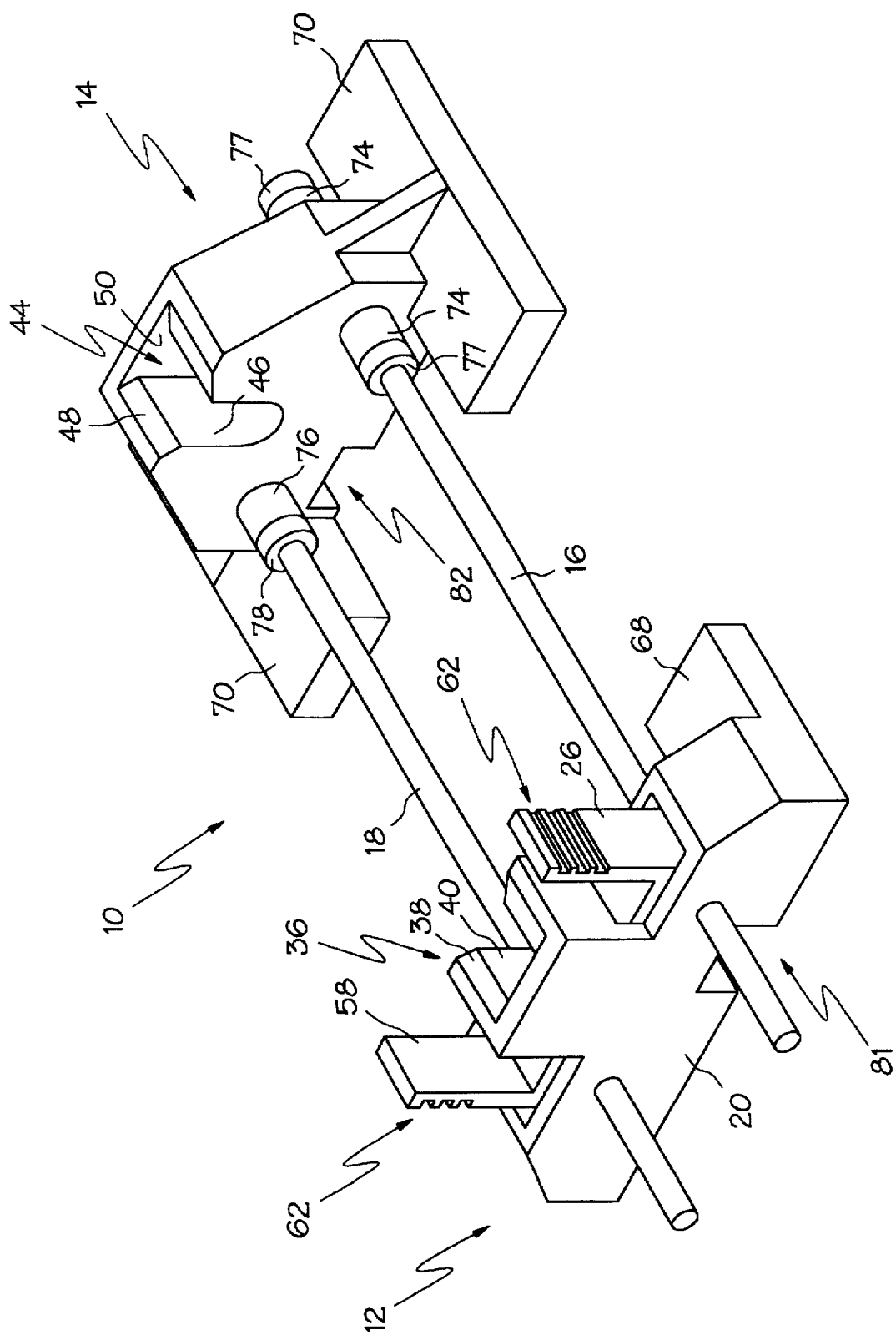
FIG. 1 is a perspective view of the open base adjustable pallet of this invention.

FIG. 1 is a perspective view of an open base adjustable pallet 10 of this invention. The pallet 10 includes a first support member 12 and a second support member 14 mounted on first and second carriage rods 16 and 18, respectively. A view of carriage rod 16 can also be seen in FIGS. 1, 4 and 5. Carriage rod 16 has a circular cross section but may have any type of cross section which would provide for proper adjustment of support members 12 and 14. For example, carriage rod 16 could also have a square, rectangular or other cross section and still function properly with this invention. Pallet 10 is transported from one work station to another by frictional engagement with a conveyor belt driving surface (not shown). Opening 82 in support member 14 and opening 81 in support member 12, are positioned, respectively, on opposite sides of the longitudinal axis of pallet 10 to allow clearance for the passage of pallet stop gates which are positioned along the conveying means. Depending upon which side of the conveying means the stop gate is located, the stop gate may engage on either support member 14 and be cleared by support member 12 or visa-versa.

Figure 2:
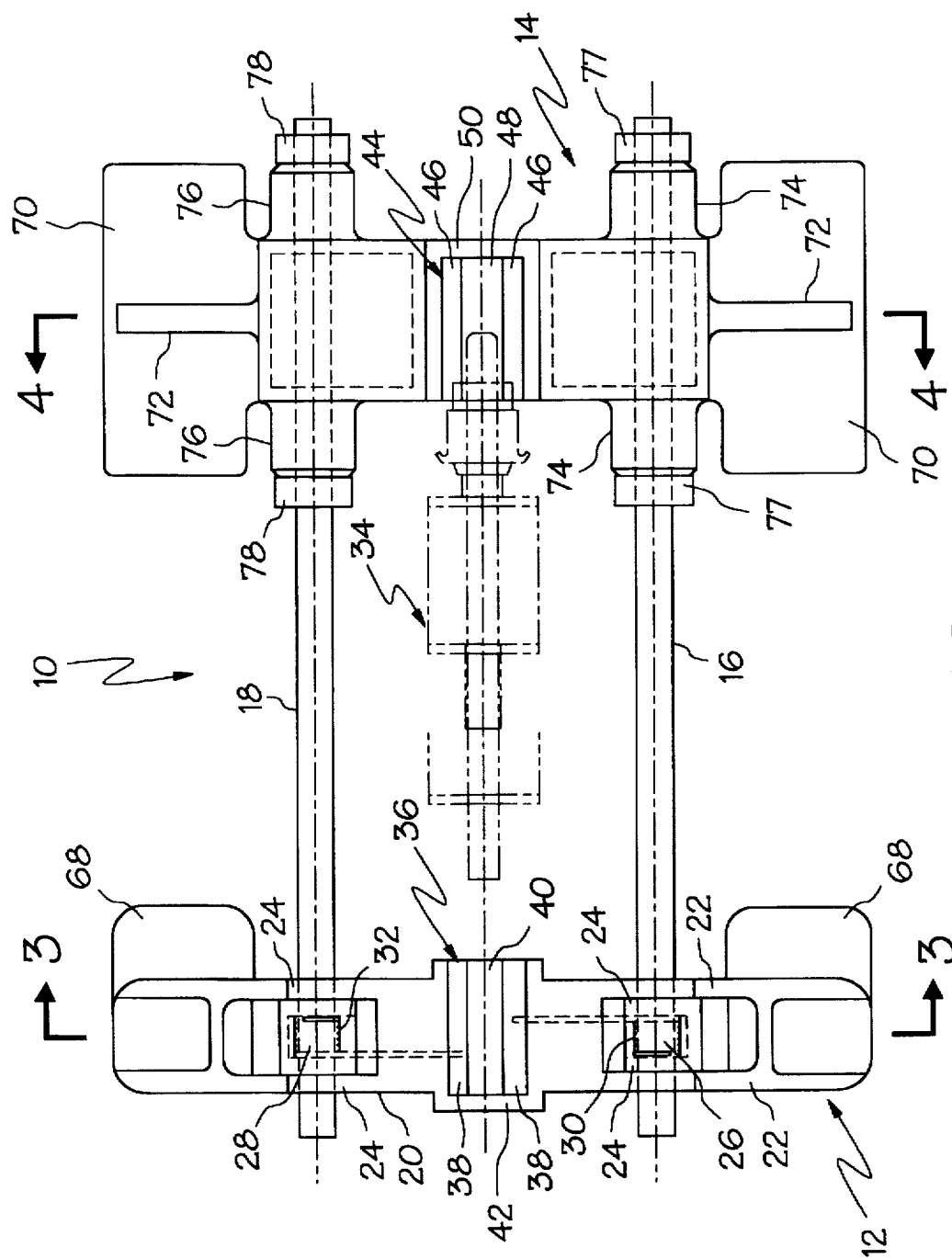
FIG. 2 is a plan view of the open base adjustable pallet of this invention.
Figure 3:
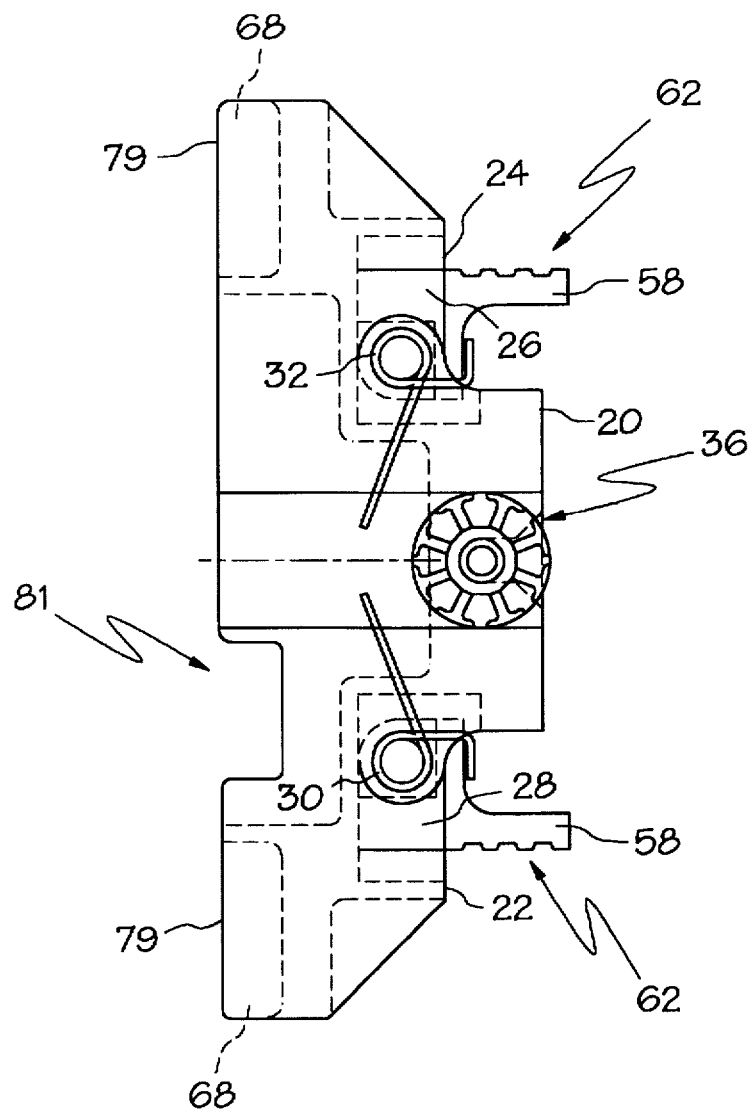
FIG. 3 is a cross-sectional view of the open base adjustable pallet of this invention taken along line 3.

As shown in FIGS. 1, 2 and 3, a first support member 12 is mounted for extensible movement on carriage rods 16 and 18. First support member 12 includes a base 20, a work piece support housing 36, a first pair of support mounts 68 having a surface 79 for frictional engagement with a conveyor device, and clip locks 26 and 28. The base 20 further includes a first pair of support arms 22 and a second pair of support arms 24. The first pair of support arms 22 and the second pair of support arms 24 extend laterally from the center of the base 20 in opposite directions and slidably engage carriage rods 16 and 18, respectively. First clip lock 26 is located between the first pair of support arms 22 and slidably engages carriage rod 16 through a pair of apertures 56 in pivot arm 64. Second clip lock 28 is positioned between the second pair of support arms 24 and slidably engages carriage rod 18 through apertures 60 (only one shown). Torsion springs 30 and 32 are positioned between pivot arms 64 and 66 on clip locks 26 and 28, respectively, to releasably engage, carriage rods 16 and 18, respectively.

First spring 30 frictionally encircles carriage rod 16 while the two ends of spring 30 are retained in base 20 and clip lock 26, respectively. Second spring 32 frictionally encircles carriage rod 18 while the two ends of spring 32 are retained in base 20 and clip lock 28, respectively.

Figure 4:
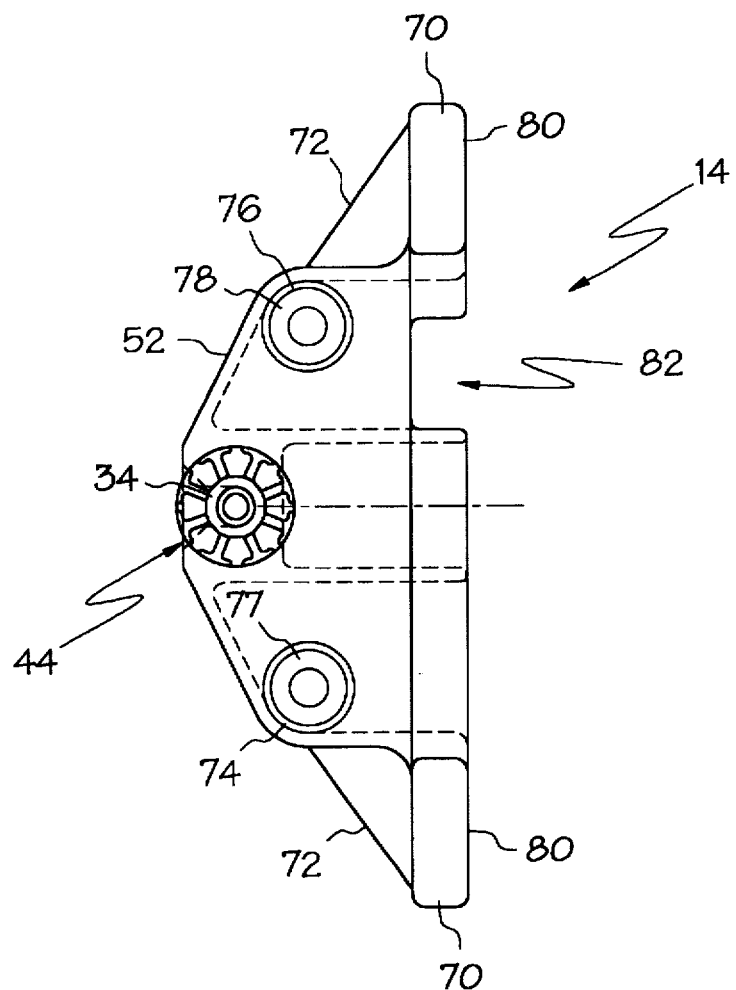
FIG. 4 is a cross-sectional view of the open base adjustable pallet of this invention taken along line 4.

In a preferred aspect of the invention and as shown in FIGS. 1, 2 and 4, second support member 14 is fixedly mounted on carriage rods 16 and 18. Second support member 14 includes first and second pairs of cylindrical support bosses 74 and 76, and corresponding retaining collars 77 and 78, respectively, on each side of support member 14, through which carriage rods 17 and 18 pass. Retaining collars 77 and 78 clamp to carriage rods 17 and 18 to fix their axial position with respect to second support member 14. Second support member 14 also includes a base 52, a pair of support walls 72, a work piece support housing 44, a second pair of support mounts 70 having a surface 80. Surfaces 80 and 79, as mentioned above, frictionally engage the conveyor device such as a conveyor belt driving surface to slidingly urge pallet 10 to translate from workstation to workstation. One end of the work piece 34 to be worked on engages work piece support housing 36 on support member 12. As can be seen in FIG. 2, work piece support housing 36 of support member 12 is shaped to receive work piece 34 and retain it in position for a work operation. Work piece support housing 36 has a mouth 38, a trough 40 and a retaining wall 42. Mouth 38 opens into trough 40 and is wider than trough 40 to provide for proper insertion of a work piece through mouth 38 and into trough 40. Mouth 38 and trough 40 can have any shape which will allow for proper insertion of a work piece into work piece support housing 36. Typically, mouth 38 will be narrower at its bottom than at its top to act as a guide for proper insertion of work piece 34. Typically, trough 40 will have either a V-shape or a U-shape to maintain the work piece 34 in position in support housing 36. One skilled in the art will appreciate that the shape of mouth 38 and trough 40 will vary depending on the type and size of the particular work piece on which the work operations are being performed.

The other end of the work piece 34 to be worked on engages work piece support housing 44 on second support member 14. A view of the work piece support housing 44 on support member 14 can be seen in FIGS. 1 and 2. Similar to support surface 12, support housing 44 of support member 14 is shaped to receive work piece 34 and retain it in position for a work operation. Work piece support housing 44 has a mouth 46, a trough 48 and a retaining wall 50. Mouth 46 opens into trough 48 and is wider than trough 48 to provide for proper insertion of a work piece through mouth 46 and into trough 48. Mouth 46 and trough 48 can have any shape which will allow for proper insertion of a work piece into work piece support chamber 44. Typically, mouth 46 will be narrower at its bottom than at its top to act as a guide for proper insertion of work piece 34. Typically, trough 48 will have either a V-shape or a U-shape to maintain the work piece 34 in position in support chamber 44. One skilled in the art will appreciate that the shape of mouth 46 and trough 48 will vary depending on the type and size of the particular work piece on which the work operations are being performed.

Retaining walls 42 and 50 are optionally provided at the outer longitudinal dimensions of the troughs 40 and 48 as a means for retaining work piece 34 in proper position in troughs 40 and 48, respectively. Walls 42 and 50 prevent work piece 34 from moving or being moved toward either support member 12 or support member 14 of pallet 10 during a work operation so that it is maintained in a constant position on pallet 10. This retaining feature is particularly useful because the work piece 34 is maintained in a constant position which is approachable from both above and below the pallet 10. One skilled in the art will appreciate that both wall 42 on support chamber 12 and wall 50 on support chamber 14 can be positioned so that work piece 34 would be prevented from any movement in relation to pallet 10. It is also possible to remove retaining walls 42 and/or 50 to allow for longer shaft extensions on workpiece 34. This allows either or both ends of workpiece 34 to extend past support members 12 and/or 14.

Figure 6:
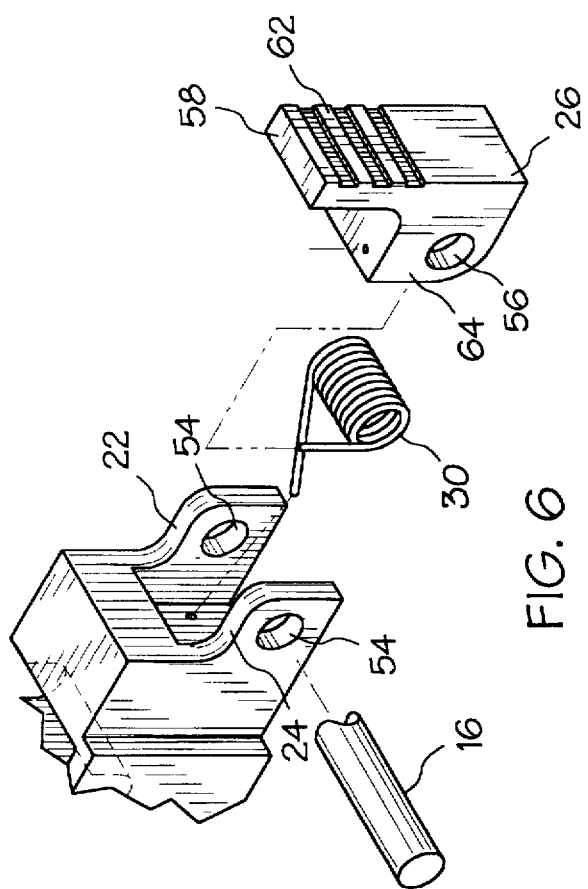
FIG. 6 is an exploded partial perspective view of the coupling device illustrated in FIG. 4.
Figure 5:
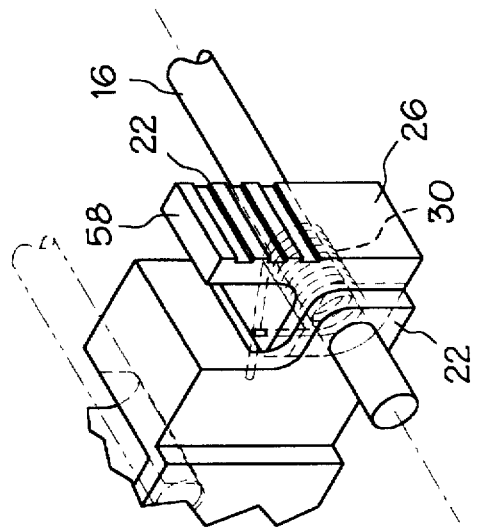
FIG. 5 is a partial perspective view of the movable support member showing a coupling device.

A partial perspective view of first support member 12 is shown in FIG. 5, and FIG. 6 shows a partially exploded view of the support member 12 illustrated in FIG. 5. Although only the workpiece support housing 36, clip lock 26, first pair of support arms 22, and carriage rod 16 are shown in FIGS. 5 and 6, one skilled in the art will appreciate that the view of the clip lock 28, the second pair of support arms 24, and the carriage rod 18 are mirror images of these illustrated work piece support housing 36, clip lock 26, first pair of support arms 22, and carriage rod 16. As shown in FIG. 6, each support arm 22 has an aperture 54, therein. Clip lock 26 has a pair of pivot arms 64, each of which has an aperture 56 which aligns with apertures 54 in support arms 22. Torsion spring 30 positioned between apertures 56 in pivot arms 64 has a helical portion which encircles carriage rod 16 and engages base 20 through a pair of apertures 54 and clip lock 26 through a second pair of apertures 56. Clip locks 26 and 28 typically include a grip region 62 on vertical arm 58 which facilitates adjustment of support member 12 as discussed below.

A view of carriage rod 16 can also be seen in FIGS. 4 and 5. Carriage rod 16 has a circular cross section but may have any type of cross section which would provide for proper adjustment of support members 12 and 14. For example, carriage rod 16 could also have a square, rectangular or other cross section and still function properly with this invention.

Springs 30 and 32 maintain support member 12 in position on pallet 10. The inside diameter of the helical portion of springs 30 and 32 measure slightly less than the outside diameter of carriage rods 16 and 18, respectively when springs 30 and 32 are in a relaxed state. When springs 30 and 32 are relaxed, the difference in diameters between spring 30 and carriage rod 16, and spring 32 and carriage rod 18 produces a frictional engagement between spring 30 and carriage rod 16, and spring 32 and carriage rod 18. This frictional engagement between the respective springs and carriage rods causes springs 30 and 32 to engage the respective carriage rods 16 and 18 and inhibit movement of support member 12 along carriage rods 16 and 18.

To move support member 12 along rods 16 and 18, springs 30 and 32 are compressed to release them from frictional engagement with respective rods 16 and 18, as described in detail below. While the following discussion describes springs 30 and carriage rod 16, those skilled in the art will appreciate that the discussion also applies to the corresponding spring 32 and carriage rod 18. When spring 30 is compressed, the inside diameter of the helical portion becomes greater than the outside diameter of carriage rod 16. Once spring 30 is compressed, support member 12 can freely travel along carriage rod 16. After support member 12 is moved to its desired position, spring 30 is relaxed. When spring 30 is relaxed, the inside diameter of the helical portion becomes less that the outside diameter of carriage rod 16 reducing the frictional engagement between spring 30 and carriage rod 16. Spring 30 allows support member 12 to be adjusted, to a position on carriage rod 16 which corresponds with the size of the work piece upon which work is to be performed. Once adjusted to that particular position on carriage rod 16, spring 30 inhibits support member 12 from moving while the work piece is being worked upon or transported on pallet 10.

As discussed above, support member 12 is mounted for travel on one end of carriage rods 16 and 18 and support member 14 is preferably fixedly engaged on the opposite end of carriage rods 16 and 18 using fastening means known in the art to secure one element to another, e.g., a chuck, screws, pins, etc.

Support member 12 can be quickly and easily adjusted in relation to support member 14 to accommodate work pieces of differing sizes. To move support member 12, springs 30 are merely compressed to disengage springs 30 from carriage rods 16 and 18 so that support member 12 is conveniently moved along carriage rods 16 and 18. To compress spring 30, clip arm 26 is pivoted by exerting inward pressure on the outer grip region 62 of vertical arm 58 of clip locks 26 and 28 toward base 12. This action causes an angular force on spring 30 which compresses spring 30. Once spring 30 has been compressed, support member 12 may be moved either toward or away from support member 12 along carriage rod 16 to provide the desired distance between the two supports to accommodate a new work piece. After support member 12 has been moved to a predetermined position, clip arm 26 is released causing spring 30 to relax and engage carriage rod 16 to maintain support member 12 at that particular position. Once support member 12 has been moved to its predetermined position, a work piece can then be placed into position on the support chambers 36 and 44, respectively. Spring 30 also provides biasing force to maintain stability of support member 12 in position on apparatus 10 and prevent support members 12 and 14 from moving during transport of a work piece.

To facilitate work pieces of differing sizes and dimensions, support members 12 and 14 can be removed from carriage rods 16 and 18 and replaced with different support members having a different size and/or shape.

In addition to being transported from one workstation to another workstation on a conveyor device, the open base adjustable pallet of the present invention can be transported from a first conveyor device to a second conveyor device. The second conveyor device may be parallel or vertical to the first conveyor device.

Having described the invention in detail and by reference to preferred embodiments thereof, it will be apparent that modifications and variations are possible, without departing from the scope of the invention described in the appended claims.

What is claimed is:

1. An open base adjustable pallet for supporting a work piece, said open base adjustable pallet comprising:

at lease one carriage rod;

a first support member mounted on one end of said at least one carriage rod for extensible travel along said at least one carriage rod, said first support member including a coupling device for releasably coupling said first support member to said at least one carriage rod, whereby said first support member is adjustably coupled on said at least one carriage rod, said coupling device comprising a pivot arm having a hole therein through which said at least one carriage rod passes, and a torsion spring having a helical portion which encircles said at least one carriage rod and frictionally engages said at least one carriage rod when said torsion spring is relaxed and disengages said at least one carriage rod when said torsion spring is compressed, wherein rotation of said pivot arm about said rod in a first direction compresses said torsion spring and enables said first support member to be moved along said rod and releasing said pivot arm relaxes said torsion spring and couples said support member to said rod;

a second support member mounted on an end of said at least one carriage rod opposite said first support member.

2. The open base adjustable pallet of claim 1 wherein said coupling device comprises a vertical arm extending perpendicularly from said pivot arm, wherein said vertical arm is pivoted to apply an angular force to said torsion spring to compress said helical portion and disengage it from said at least one carriage rod.

3. The open base adjustable pallet of claim 2 wherein said pallet comprises:

first and second carriage rods, said first and said second carriage rods being parallel to each other;

A first support member having holes therein through which said first and said second carriage rods pass, said first support member including (a) a first torsion spring having a helical portion which encircles said first carriage rod, wherein said helical portion of said first torsion spring engages said first carriage rod when said first torsion spring is relaxed and disengages from said first carriage rod, when said first torsion spring is compressed and (b) a second torsion spring having a helical portion which encircles said second carriage rod, wherein said helical portion of said second torsion spring engages said second carriage rod when said second torsion spring is relaxed and disengages from said second carriage rod when said second torsion spring is compressed.

4. The open base adjustable pallet of claim 3 wherein said first support member further comprises:

a pair of integral support arms, each of said support arms having an aperture therein through which one of said first and second carriage rods passes; and first and second coupling devices wherein said first coupling device has a pair of pivot arms which house said first torsion spring, each of said pivot arms having a hole therein through which said first carriage rod passes, said first torsion spring engaging said first carriage rod such that, upon pivoting said first coupling device inwardly toward the center of said first support member, an angular force is applied to said first torsion spring to compress said first torsion spring and disengage it from said first carriage rod, and wherein said second coupling device has a pair of pivot arms which houses said second torsion spring, each of said pivot arms having a hole therein through which said second carriage rod passes, said second torsion spring engaging said second carriage rod such that, upon pivoting said second coupling device inwardly toward the center of said first support member, an angular force is applied to said second torsion spring to compress said second torsion spring and disengage it from said second carriage rod.

5. The open base adjustable pallet of claim 1 wherein said second support member is fixedly mounted on said first and said second carriage rods.

6. The open base adjustable pallet of claim 1 wherein each of said first and second support members includes a work piece support housing shaped to accept a work piece and to prevent movement of the work piece as it rests on said first and second support members.

7. The open base adjustable pallet of claim 1 wherein said first and said second support members can be removed from said first and said second carriage rods and replaced with support members of different sizes and shapes to accommodate work pieces of different sizes and shapes.

8. The open base adjustable pallet of claim 1 wherein said at least one carriage rod has a circular cross section.

9. The open base adjustable pallet of claim 1 wherein said work piece is accessible from above and below said pallet.

10. An open base adjustable pallet for supporting a work piece said open base adjustable pallet comprising:

first and second carriage rods, said first and said second carriage rods having a circular cross section;

a first support member mounted on said first and second carriage rods, said first support member having first and second holes therein through which said first and said second carriage rods, respectively, pass for extensible travel of said first support member along said first and said second carriage rods, said first support member including (a) a first pair of integral support arms, each support arm of said first pair of integral support arms having a hole therein through which said first carriage rod passes, a first clip lock having a pair of pivot arms, each pivot arm of said pair of pivot arms having a hole therein through which said first carriage rod passes, said first clip lock including a first torsion spring having a helical portion aligned between said pivot arms wherein said helical portion of said first torsion spring encircles said first carriage rod, and engages said first carriage rod when said first torsion spring is relaxed and disengages from said first carriage rod when said first torsion spring is compressed, and (b) a second pair of integral support arms, each support arm of said second pair of integral support arms having a hole therein through which said second carriage rod passes, a second clip lock having a pair of pivot arms, each pivot arm of said pair of pivot arms having a hole therein through which said second carriage rod passes, said second clip lock including a second torsion spring having a helical portion aligned between said pivot arms wherein said helical portion of said second torsion spring encircles said second carriage rod, and engages said second carriage rod when said second torsion spring is relaxed and disengages from said second carriage rod when said second torsion spring is compressed, and (c) a work piece support housing of a shape and size to accept a work piece to be worked on, and (d) first and second support mounts on each end, respectively, of said first support member, each of said first and second support mounts having a bottom surface for frictionally engaging a conveyor device; and a second support member mounted on said first and second carriage rods opposite said first support member, said second support member having first and second holes therein through which said first and said second carriage rods, respectively, pass, said second support member including (e) a first pair of cylindrical support bosses on opposite sides of and adjacent to said second support member and aligned with said first hole therein through which said first carriage rod passes, (f) a first pair of retaining collars at the distal ends of said first pair of cylindrical support bosses to fix said second support member to said first carriage rod, (g) a second pair of cylindrical support bosses on opposite sides of and adjacent to said second support member and aligned with said second hole therein through which said second carriage rod passes, (h) a second pair of retaining collars at the distal ends of said second pair of cylindrical support bosses to fix said second support member to said second carriage rod, (i) a work piece support housing of a shape and size to accept a work piece to be worked on, and (j) first and second support mounts on each end, respectively, of said second support member, each of said first and second support mounts having a bottom surface for frictionally engaging a conveyor device.

11. The open base adjustable pallet of claim 10 wherein each of said first and said second support members has a gap in the bottom surface thereof to permit passage of pallet stop gates positioned along said conveyor device.

12. The open base adjustable pallet of claim 10 wherein said open base adjustable pallet is moved from a first conveyor to a second conveyor by releasably engaging a gripping or lifting means on said first and said second carriage rods, raising said open base adjustable pallet from said first conveyor device, placing said open base adjustable pallet on said second conveyor, and disengaging said gripping or lifting means from said first and said second carriage rods.

13. A method for adjusting an open base adjustable pallet to accommodate work pieces of differing sizes comprising the stop of:

Providing an open base adjustable pallet comprising first and second support members mounted on said at least one carriage rod, wherein said first support member is slidable mounted on said at least one carriage rod for extensible travel along said carriage rod, said first support member comprising a coupling device to provide extensible travel of said first support member along said at least one carriage rod;

determining the size of a work piece to be worked on;

determining the position of said first support member in relation to said second support member to accommodate said work piece;

disengaging said coupling device wherein said first support member is free to move along said at least one carriage rod;

Slidably adjusting said first support member in relation to said second support member to a desired position along said at least one carriage rod; and engaging said coupling device wherein said first support member is coupled to said at least one carriage rod, wherein said coupling device comprises a pair of pivot arms, each pivot arm of said pair of pivot arms having a hole therein through which said at least one carriage rod passes, and a torsion spring having a helical portion aligned between said pivot arms wherein said helical portion encircles said at least one carriage rod and frictionally engages said at least one carriage rod when said torsion spring is relaxed and disengages from said at least one carriage rod when said torsion spring is compressed.

14. The method of claim 13 wherein said open base adjustable pallet comprises first and second support members mounted on first and second carriage rods, said first support member further comprising a second coupling device including a second torsion spring having a helical portion which encircles said second carriage rod wherein said helical portion of said second tension spring frictionally engages said second carriage rod when said second torsion spring is relaxed and disengages from said second carriage rod when said second torsion spring is compressed.

* * * * *